(12) United States Patent
Wallner et al.

(10) Patent No.: US 11,218,348 B2
(45) Date of Patent: Jan. 4, 2022

(54) ACOUSTIC SECURE TRANSMISSION (AST)

(71) Applicant: Samsung Electronics Co., Ltd., Suwon-si (KR)

(72) Inventors: George Wallner, Miami Beach, FL (US); William Wang Graylin, Winchester, MA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 16/605,458

(22) PCT Filed: Apr. 12, 2018

(86) PCT No.: PCT/US2018/027305
§ 371 (c)(1),
(2) Date: Oct. 15, 2019

(87) PCT Pub. No.: WO2018/191498
PCT Pub. Date: Oct. 18, 2018

(65) Prior Publication Data
US 2020/0052938 A1    Feb. 13, 2020

Related U.S. Application Data

(60) Provisional application No. 62/485,603, filed on Apr. 14, 2017.

(51) Int. Cl.
*H04B 14/04* (2006.01)
*H04L 27/12* (2006.01)
(Continued)

(52) U.S. Cl.
CPC ............ *H04L 27/12* (2013.01); *H04B 14/04* (2013.01); *H04L 27/0008* (2013.01);
(Continued)

(58) Field of Classification Search
CPC ... H04L 67/125; H04L 67/303; H04L 63/083; H04L 63/108; H04L 27/12; H04L 27/14; H04L 27/0008; H04L 27/20; H04L 2027/0051; H04N 21/437; H04N 21/6334; H04N 21/25816; H04N 21/41407; H04N 21/43637; H04N 21/44227; H04N 21/4753; H04N 21/478; H04R 2217/03; H04R 2499/15; H04R 3/005; H04R 9/025; H04W 4/80; H03K 2217/96003; H03K 17/96; B06B 1/06; H04B 14/04
See application file for complete search history.

(56) References Cited

U.S. PATENT DOCUMENTS 4,599,723 A * 7/1986 Eck ..................... H04L 1/08
375/368
5,051,799 A   9/1991 Paul et al.
(Continued)

OTHER PUBLICATIONS

European Search Report dated Feb. 26, 2020; European Appln. 18784409.7-1213 / 3600060 PCT/US2018027305.

*Primary Examiner* — Rahel Guarino
(74) *Attorney, Agent, or Firm* — Jefferson IP Law, LLP

(57) ABSTRACT

Device, system and method of securely transmitting information from a mobile device or application or a user device to a mobile phone or other acoustic aware devices using audio frequency encoded data and security token transmission.

20 Claims, 4 Drawing Sheets

(51) Int. Cl.
*H04L 27/00* (2006.01)
*H04L 27/14* (2006.01)
*H04L 27/20* (2006.01)

(52) U.S. Cl.
CPC .............. *H04L 27/14* (2013.01); *H04L 27/20* (2013.01); *H04L 2027/0051* (2013.01); *H04R 2217/03* (2013.01)

(56) References Cited

U.S. PATENT DOCUMENTS

| | | | |
|---|---|---|---|
| 8,514,662 B2 | 8/2013 | Paulson | |
| 8,930,702 B2 | 1/2015 | Marien | |
| 2004/0133789 A1* | 7/2004 | Gantman | G07C 9/23 713/189 |
| 2004/0264713 A1 | 12/2004 | Grzesek | |
| 2005/0167495 A1* | 8/2005 | Morley, Jr. | G07D 7/04 235/449 |
| 2008/0123683 A1* | 5/2008 | Cheng | H04L 67/306 370/464 |
| 2012/0051187 A1* | 3/2012 | Paulson | H04B 11/00 367/135 |
| 2012/0221859 A1 | 8/2012 | Marien | |
| 2013/0054474 A1* | 2/2013 | Yeager | G06Q 20/02 705/71 |
| 2014/0068272 A1* | 3/2014 | Savtchenko | H04L 9/3226 713/185 |
| 2014/0109211 A1 | 4/2014 | Suzuki et al. | |
| 2014/0355386 A1 | 12/2014 | Paulson | |
| 2016/0162883 A1 | 6/2016 | Liscia et al. | |

\* cited by examiner

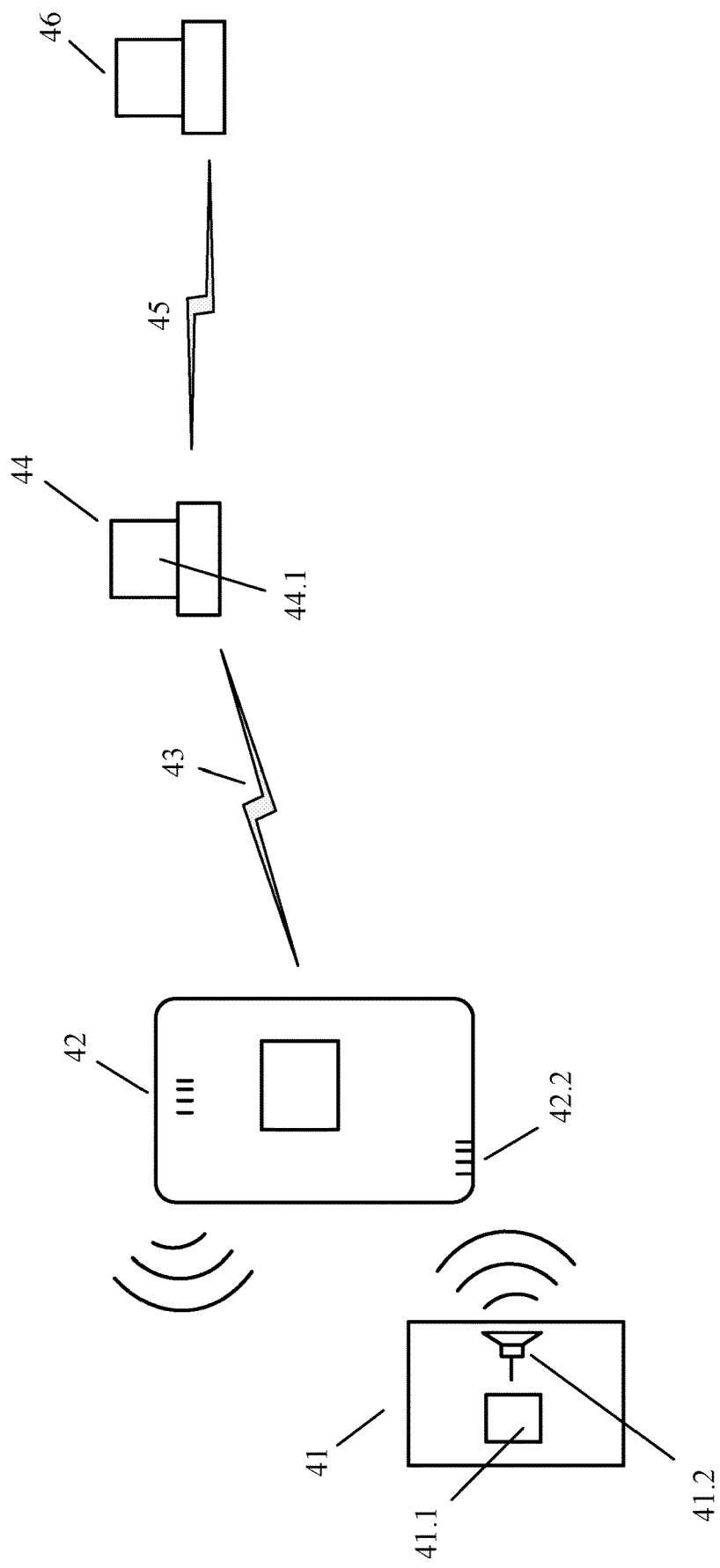

ACOUSTIC SECURE TRANSMISSION (AST)

CROSS REFERENCE TO RELATED APPLICATION DATA

This application claims the benefit of U.S. Provisional Patent Application No. 62/485,603 filed on Apr. 14, 2017 the contents of which are incorporated herein by reference in its entirety.

BACKGROUND

Electronic transmission devices are becoming increasingly available. Mobile device electronic transmissions rely on electronic equipment to read electronic data transmitted by a handset, contactless card or electronic device of a user. The most commonly supported methods for transmitting electronic transmissions are Near Field Communication (NFC), Magnetic Secure Transmission (MST) and 2D Barcodes. As electronic transmissions gain wider adoption, and intelligent connected transmission devices proliferate, the need is arising to expand acceptance to more types of devices and entities that receive transmissions, including smaller entities and even individuals, and voice assistant devices like Amazon Echo or Google Home.

Fraud is causing traditional identifying information (e.g. card numbers) to be replaced by one-time tokens, which, unlike traditional numbers, codes or other identifying information, cannot be delivered by voice over the phone. Tokens need electronic delivery to be secure.

Using sound to transmit transaction information to a terminal is known, (See e.g., U.S. Pat. No. 8,976,959). However, such implementations are costly and generally limited to mobile phone applications. Also, such known applications have limited security.

Small entities and individuals often do not have equipment capable of reading electronic data, e.g. transmission information and especially tokens. Although some smartphones have NFC capability, many are locked like iPhones. Smartphones generally do not have magnetic stripe reading capability and external readers are not justified or available. While smartphones can read barcodes, traditional cards and low cost intelligent connected transmission devices cannot display barcodes.

SUMMARY

The present disclosure describes a device, system and method that enables any mobile handset, tablet or even acoustic enabled voice assistant devices like Amazon Alexa/ECHO and Google Home devices to accept tokenized data (e.g., user identification data, such as from credit cards, debit cards or the like) from other handsets or intelligent connected transmission devices without the need for external hardware. The system employs specially encoded sound transmission in the high audio frequency range to transmit the data. The device, system and method enables both mobile handsets and low cost devices to transmit to virtually all mobile handsets, tablets and voice assistants.

The implementation according to the present disclosure provides sound transmission of secure identifying information (Acoustic Secure Transmission—AST) for low cost intelligent connected transmission devices to transmit data (e.g., not just a phone application). The present disclosure provides for the data to be tokenized data as opposed to static data with limited or no security. The present disclosure also provides for mobile phones to become receivers of transmitted data, and it provides for voice assistants or voice enabled kiosks and devices, and telephone operating systems to become receivers of the tokenized data.

This has outlined the features and technical advantages of the present disclosure in order that the detailed description that follows may be better understood. Additional features and advantages of the disclosure will be described below. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 4 illustrates an implementation of an acceptance program of the acoustic secure transmission implementation according to the disclosure hosted on the cloud and interacting with the user through a voice assistant device.

DETAILED DESCRIPTION

Figure 1:
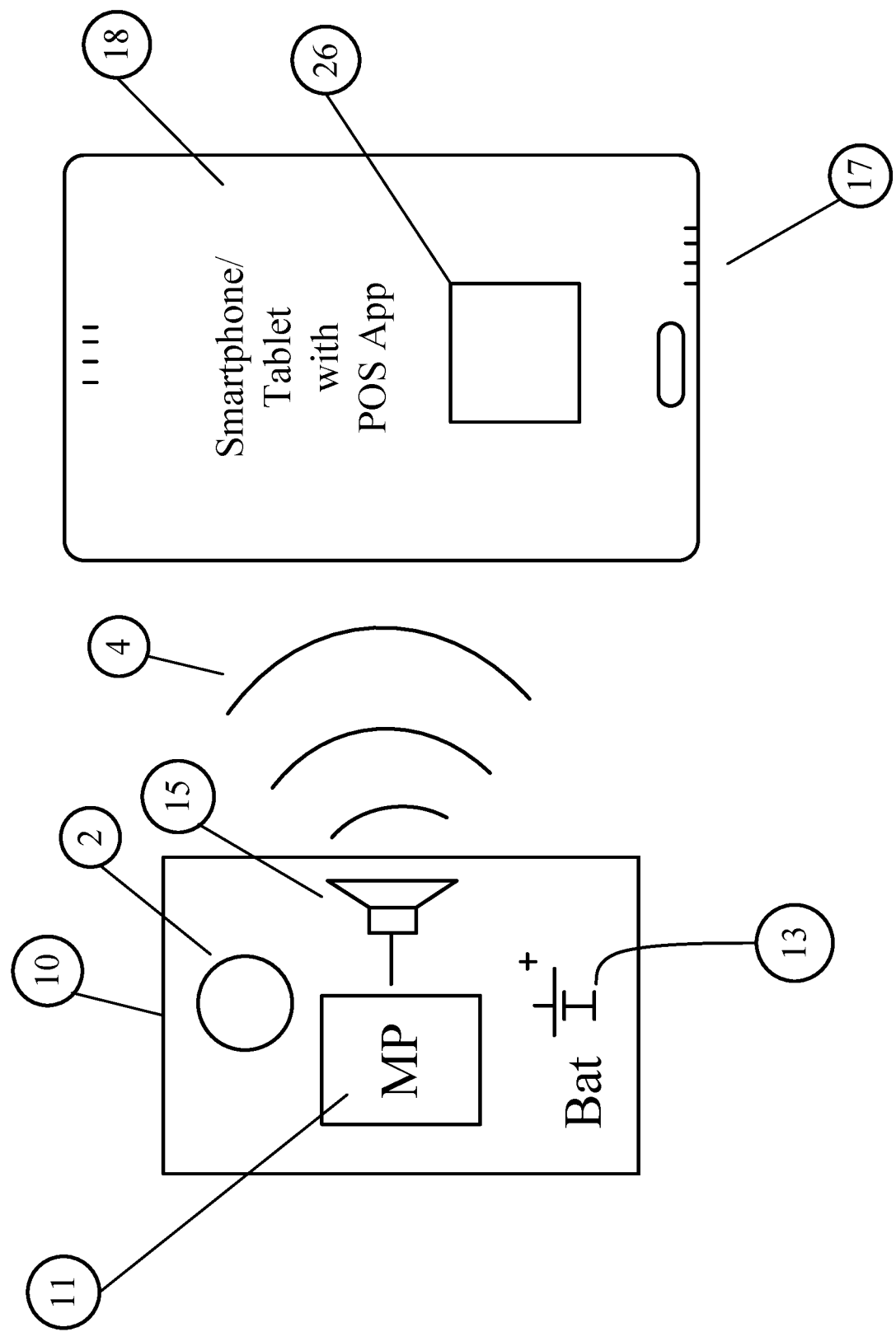
FIG. 1 illustrates a block diagram of the acoustic secure transmission implementation according to the disclosure.

As illustrated in FIG. 1, an intelligent connected transmission device (e.g., a transmitter) (10) or handset (e.g., a user device) contains a microprocessor 11 and/or other electronics implementing the functionality as described herein. The device (10) also includes a battery (13) and a button or actuator (12). The microprocessor and/or electronics (such as memory) is programmed (or programmable) to provide a special purpose processor implementing acoustic secure transmission as described. When a secure transmission is being made, the user presses the button (12) or authenticates using a fingerprint reader (not shown), which in turn generates a stream of electrical impulses representing the user's credentials. Such user credentials can include electronic tokens, simulated credit card information or other identifying information such as at least one of name, billing address, shipping address, email, or phone number. The information may also include a transaction amount.

The electrical impulses can be baseband or can include a modulated audio frequency carrier. A transducer (15) converts the electrical impulses into sound signals which are emitted through a suitable opening in the housing. The transducer may be a linear transducer, such as a speaker, or a low cost non-linear piezo sounder.

A handset or tablet (18) is acting as a mobile terminal (e.g., a remote terminal) receiving the acoustic secure transmission in that it contains a memory with a transmission acceptance application program (26) that has access to the handset's (18) microphone (17) receiving the acoustic secure transmission. The handset (18) may have access to, or include, electronics and/or related software that processes the received acoustic secure transmission, such as for analog to digital conversion.

Figure 2:
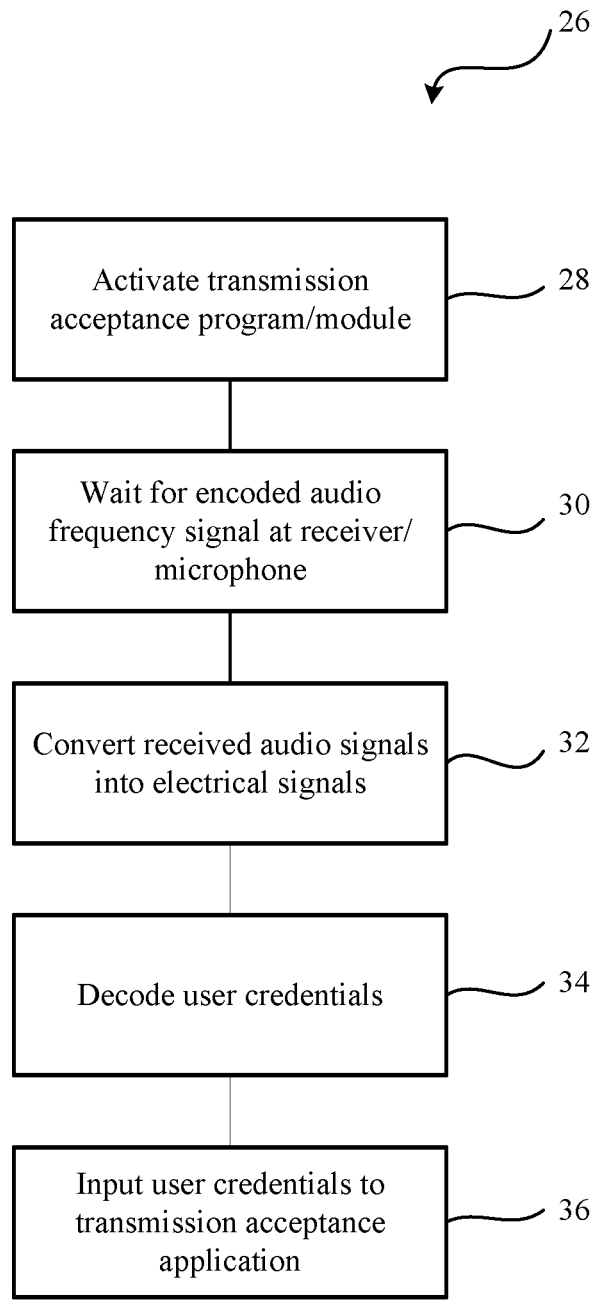
FIG. 2 illustrates a flow diagram of an acceptance program/module receiving acoustic secure transmissions according to the disclosure.

A flow diagram of the transmission acceptance program or module operation (e.g., a method of securely transmitting/receiving data) is illustrated in FIG. 2. When the transmission acceptance program (26) (e.g., a data processing module) is activated (28), it waits for the suitably encoded audio frequency signal to appear on the handset's microphone (30). The received audio signals are converted by the microphone (7) into electrical signals (32), which are then processed or decoded (34) by the application's decoder software. The decoded user credentials, and other data (e.g. contact information of the user), are then used as input (36) to a transmission acceptance application or module. The decoded user credentials for input to the transmission acceptance application/module may be encrypted for communication to the transmission acceptance application/module.

Figure 3:
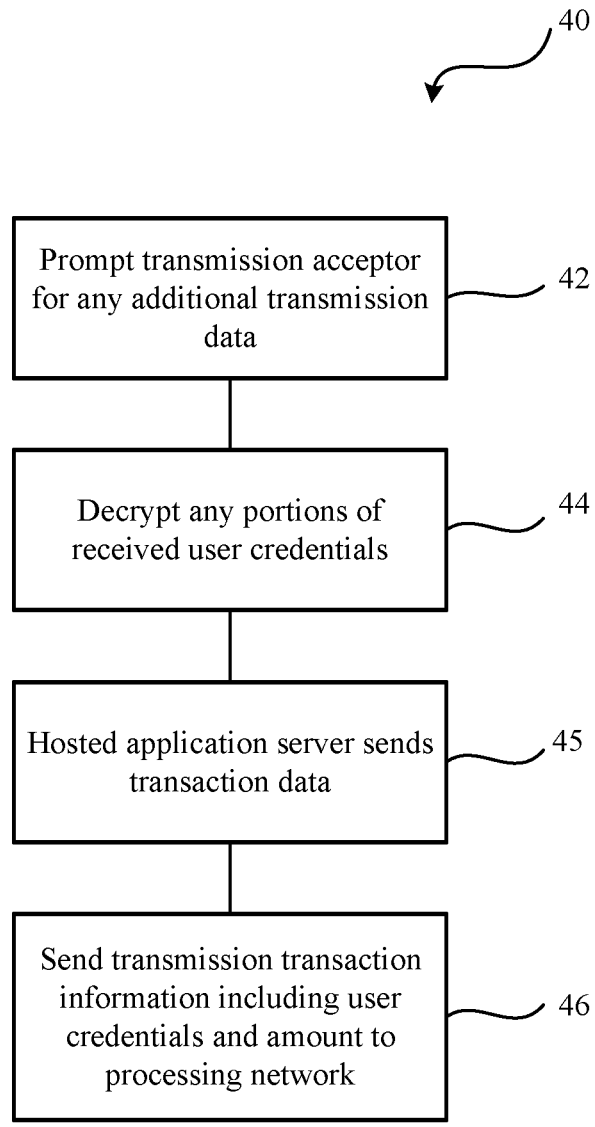
FIG. 3 illustrates a flow diagram of an acceptance application/module receiving decoded user credentials from the acceptance program/module according to the disclosure.

Operation of the transmission acceptance application or module (40), illustrated in FIG. 3, prompts a transmission acceptor for any additional transmission data (42), for example, transaction amount as necessary. Any portion of the decoded user credentials input to the transmission acceptance application/module that may have been encrypted for communication to the transmission acceptance application/module are decrypted (44) by the transmission acceptance application/module. Then, the transmission acceptance application/module sends the transmission to a hosted application server (45) that then sends the transmission data to a transmission gateway or transmission processor (46). Again, the transmission data can also include additional data such as transaction amount, and contact information of the user as an option (e.g., one or more of name, billing/shipping address, email, phone number).

As illustrated in FIG. 4, the transmission acceptance program (44.1) can also be hosted on the cloud and interacts with the user through a voice assistant device connected to a processing network. An offer from the voice assistant or voice enabled kiosk (42) having a microphone (42.2), or a request to transmit by the user may be communicated between the voice assistant and the user, when a transmission is requested by the voice assistant (e.g., on behalf of a merchant, with a merchant ID), instead of using user information on file, the transmission acceptance program can prompt user to transact with the AST enabled device (41) and listens for the acoustic transmission (transmitting information which can include user data, name, billing, shipping information). The device (41) includes a processor/audio driver (41.1) and a transducer (41.2). When the transmission is received through a communications link (43) by the AST acceptance program (44.1), it decodes the data and sends the tokenized payment data through another communications link (45) to a gateway or processor (46) to complete the transmission on behalf of that entity. When the transmission is authorized or declined, the voice assistant server (44) relays the information to the user via voice assistant (42) and completes the order for the user.

This type of acoustic tokenized transmission method can also be added to telephone order transmission systems. Instead of having operators receive static Personal Account Numbers that can be copied and reused, the operator can leverage a PC, Tablet or mobile phone based AST Card Acceptance Program in front of him/her and prompt the user to transmit their AST data through the phone and process the transmission as illustrated in FIG. 1. In a "Voice First" world, the ability for a user to transmit his/her transaction, contract and shipping information all via a short AST sound wave to someone face to face, over the phone or via Voice Assistants and Kiosk, provides a powerful, fast and secure way to conduct transactions.

The acoustic secure transmission involves information encoding prior to transmission. The transmission information data, including one or more tokens, is first serialized and then encoded using one of many possible data encoding methods, such as Hex, ASCII, etc. In one possible embodiment of the encoding, the data may be transmitted asynchronously and encoded in a hex format with start, stop and parity bits added. In other implementations, data character encoding may follow at least one of ISO7811 and ISO7813 character allocations. Other encoding methods may also be used.

In one embodiment, the serialized and encoded data is sent to a modulator that uses the data to modulate a carrier in the audio or high audio frequency range. Given that the transmission and electronic token information is transmitted using sound waves, the audio frequency signals may use a number of modulation schemes. For example, Frequency Shift Keying modulation may be used for transmitting the transmission information as sound waves. Frequency Shift Keying (FSK) (e.g., a Frequency Shift Keying (FSK) modulation scheme) uses to two discrete frequencies (F0 and F1) to represent binary zeros and ones. The two frequencies are transmitted alternatingly at the rate of the bit rate. In one implementation of the method the frequency of 6.0 kHz represents the binary value of zero and the frequency of 7.2 kHz represents the binary value of one. Alternatively, a frequency change could represent a change from zero to 1, or one to zero.

The frequency shift keying frequencies can be chosen to coincide with approximate resonant frequencies of a non-linear transducer (i.e. a transducer used for sonically transmitting the data or information). The frequency shift modulation rate may also be chosen such that it is sub-harmonically related to the carrier frequencies to provide continuous phase frequency shift keying related to the resonant frequencies of the transducer.

As another example for transmitting the transmission and token information using sound waves, the audio frequency signals may be transmitted using modulation schemes involving multi-frequency FSK and multiple transmissions. To overcome the variances in the audio transmission path, multiple FSK frequency pairs may be used in a sequence of transmissions. For example, data would be transmitted first using the frequency pair of 6.0 and 7.2 kHz. Followed by the same data being transmitted using a second frequency pair, such as 6.8 and 8.4 kHz, and then transmitted a third time using yet a different frequency pair. The frequency shift could also change between segments. To further improve delivery reliability, data in a sequence may be transmitted at different data rates. For example, data could be transmitted first at 1200 bps, then at 600 bps, followed by 300 bps.

In another implementation of data transmission and token information transmission using sound waves, the audio frequency signals may be transmitted using phase shift keying in conjunction with either asynchronous or Frequency to Frequency (F2F) synchronous encoding with phase shifts indicating a bit level change or the F2F polarity change.

Error detection and correction may be implemented with the secure audio transmission of token information. Because the audio path is subject to external noise and distortions, error checking can be implemented using a parity bit added to each character and a Longitudinal Redundancy Check (LRC) character. Other error detection methods, such as CRC-16 or CRC-32 may also be used. For detected data errors, error correction such as Reed-Solomon or Forward Error Correction (FEC) or channel coding may be added to further improve audio data transmission reliability.

In another implementation of transmission and token information using sound waves, Token Payment Devices (TPDs) may be used in conjunction with point of sale (POS) devices/programs/procedures to securely transmit payment information.

Although distinct acceptance program or module and acceptance application or module are described herein, it should be appreciated by those skilled in the art that functionality of the respective modules may be combined into a single module, or the functionality may be separate as described or in alternative arrangements of functionality.

The detailed description set forth above, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Those skilled in the art should appreciate that all parameters and configurations described herein are meant to be exemplary and that actual parameters and configurations will depend upon the specific application for which the systems and methods of the present disclosure are used. Those skilled in the art should appreciate that there are equivalents to the specific embodiments described herein. It is, therefore, to be understood that the foregoing embodiments are presented by way of example only and that the claimed system and methods of the disclosure may be practiced otherwise than as specifically described.

What is claimed is:

1. A transmitter for securely transmitting data, comprising:
    an actuator configured to generate electrical impulses, the electrical impulses including user credentials comprising an electronic token;
    an encoder configured to serialize and encode the user credentials including the electronic token; and
    a transducer configured to sonically transmit the electrical impulses including the user credentials and electronic token in response to actuation of the actuator,
    wherein the electrical impulses comprises modulated audio frequency carrier signals,
    wherein the audio frequency carrier signals are transmitted using modulation schemes involving multi-frequency FSK (frequency shift keying) and multiple transmissions,
    wherein multiple FSK frequency pairs are used in a sequence of transmissions,
    wherein data in the sequence is transmitted at different data rates, and
    wherein, in the sequence, two frequencies are transmitted alternatingly at a rate of a bit rate.

2. The transmitter of claim 1 wherein the electrical impulses comprise baseband or modulated audio frequency carrier signals.

3. The transmitter of claim 1 wherein the transducer comprises a linear transducer or a non-linear piezo sounder.

4. A system for securely transmitting data, comprising:
    a transmitter configured to securely transmit the data, the transmitter comprising:
        an actuator configured to generate electrical impulses, the electrical impulses including user credentials from the data and a token,
        an encoder configured to serialize and encode the user credentials and the token, and
        a transducer configured to sonically transmit the electrical impulses as sound signals; and
    a user device configured to securely receive the sound signals, the user device comprising a data processing module,
    wherein the electrical impulses comprises modulated audio frequency carrier signals,
    wherein the audio frequency carrier signals are transmitted using modulation schemes involving multi-frequency FSK (frequency shift keying) and multiple transmissions,
    wherein multiple FSK frequency pairs are used in a sequence of transmissions,
    wherein data in the sequence is transmitted at different data rates, and
    wherein, in the sequence, two frequencies are transmitted alternatingly at a rate of a bit rate.

5. The system of claim 4 wherein the user device includes a tablet or a kiosk.

6. The system of claim 4 wherein the user device further comprises a microphone configured to sonically receive the sound signals.

7. A method of securely transmitting data, the method comprising:
    providing user credentials comprising an electronic token;
    generating electrical impulses representing the user credentials;
    serializing and encoding the user credentials and the electronic token;

converting, using a transducer, the electrical impulses representing the user credentials into sound signals representing the user credentials;

transmitting the sound signals representing the user credentials sonically to an acceptance module; and decoding the sound signals representing the user credentials and sending decoded credentials, including the electronic token, to a processing network, wherein the electrical impulses comprises modulated audio frequency carrier signals, wherein the audio frequency carrier signals are transmitted using modulation schemes involving multi-frequency FSK (frequency shift keying) and multiple transmissions, wherein multiple FSK frequency pairs are used in a sequence of transmissions, wherein data in the sequence is transmitted at different data rates, and wherein, in the sequence, two frequencies are transmitted alternatingly at a rate of a bit rate.

8. The method of claim 7 wherein the decoding the sound signals representing the user credentials is done at a remote terminal having the transducer receiving the sound signals representing the user credentials.

9. The method of claim 7 wherein the user credentials provided including the electronic token includes identifying information of a user as at least one of name, billing address, shipping address, email, or phone number.

10. The method of claim 7 wherein at least one of the generating or converting steps involves encoding the user credentials, including the electronic token, using asynchronous encoding with start and stop bits.

11. The method of claim 10 wherein the encoding follows at least one of ISO78 11 or ISO78 13 character allocations.

12. The method of claim 7 wherein the step of transmitting the sound signals representing the user credentials sonically uses a Frequency Shift Keying (FSK) modulation scheme.

13. The method of claim 12 wherein the Frequency Shift Keying (FSK) modulation scheme uses a frequency change to represent a change from zero to one, or one to zero.

14. The method of claim 12 wherein the Frequency Shift Keying (FSK) modulation scheme uses to two discrete frequencies (F0 and F 1) to represent zeros and ones in binary.

15. The method of claim 14 wherein the Frequency Shift Keying (FSK) modulation scheme uses a frequency of 6.0 kHz to represent zero in binary and a frequency of 7.2 kHz to represent one in binary.

16. The method of claim 14 wherein frequency shift keying frequencies are chosen to coincide with resonant frequencies of a non-linear transducer.

17. The method of claim 14 wherein a frequency shift modulation rate is chosen such that it is sub-harmonically related to carrier frequencies to provide continuous phase frequency shift keying related to resonant frequencies of the transducer.

18. The method of claim 7 further including a step of error detection and correction implemented with a secure audio transmission that includes token information.

19. The method of claim 18 wherein the step of error detection and correction implemented with the secure audio transmission is implemented using a parity bit added to each character.

20. The method of claim 18 wherein the step of error detection and correction implemented with the secure audio transmission is implemented using a parity bit added to each character and a Longitudinal Redundancy Check (LRC) character.

* * * * *